US012657963B2

(12) United States Patent
Shin et al.

(10) Patent No.: US 12,657,963 B2
(45) Date of Patent: Jun. 16, 2026

(54) VEHICLE AND ELECTRONIC TOLL COLLECTION SYSTEM

(71) Applicants: HYUNDAI MOTOR COMPANY, Seoul (KR); KIA CORPORATION, Seoul (KR)

(72) Inventors: Dong Chan Shin, Hwaseong-si (KR); Seung Jae Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/882,086

(22) Filed: Sep. 11, 2024

(65) Prior Publication Data

US 2025/0140024 A1 May 1, 2025

(30) Foreign Application Priority Data

Oct. 27, 2023 (KR) ........................ 10-2023-0145154

(51) Int. Cl.
*G07B 15/06* (2011.01)
*G06Q 20/32* (2012.01)

(52) U.S. Cl.
CPC ......... *G07B 15/063* (2013.01); *G06Q 20/322* (2013.01); *G06Q 20/3263* (2020.05)

(58) Field of Classification Search
None
See application file for complete search history.

(56) References Cited

U.S. PATENT DOCUMENTS

| | | | | |
|---|---|---|---|---|
| 12,437,285 | B1 * | 10/2025 | Gravelle | ................. H04W 4/80 |
| 2016/0189146 | A1 * | 6/2016 | Cattone | .............. G06Q 20/3829 |
| | | | | 398/128 |
| 2019/0279437 | A1 * | 9/2019 | Borras | ................... G06Q 50/40 |
| 2023/0105089 | A1 * | 4/2023 | Lee | ...................... G06Q 20/405 |
| | | | | 705/44 |

FOREIGN PATENT DOCUMENTS

| | | | | | |
|---|---|---|---|---|---|
| CN | 116665328 | A | * | 8/2023 | |
| DE | 102022125933 | A1 | * | 4/2023 | ........... G07B 15/063 |
| JP | 2008026227 | A | * | 2/2008 | |

* cited by examiner

*Primary Examiner* — Jeff Zimmerman
*Assistant Examiner* — Jorge G Del Toro-Ortega
(74) *Attorney, Agent, or Firm* — MCDONNELL BOEHNEN HULBERT & BERGHOFF LLP

(57) ABSTRACT

The electronic toll collection system includes a mobile device of a first user, a vehicle including a memory configured to store first login information of the first user and second login information of a second user and an IC chip configured to perform payment, and a server configured to communicate with the mobile device and the vehicle. The server, upon receiving the first login information of the first user and sharing condition information for the IC chip from the vehicle, the IC chip as a sharable chip, transmits, upon receiving the second login information of the second user and sharing request information from the vehicle, the received sharing request information to the mobile device, and transmits, upon receiving sharing approval information and sharing condition information from the mobile device, the activation command or deactivation command of the IC chip to the vehicle based on the received sharing condition information.

20 Claims, 11 Drawing Sheets

FIG. 8

| | |
|---|---|
| identification information of sharing requester | USER 2 |
| identification information of sharing provider | USER 1 |
| payment availability time information (sharing date, time information) | 2023. 3. 1. 8:00 ~ 2023. 3. 3. 20:00 |
| payment limit information | ₩100,000 |
| identification of vehicle | VIN 7000 |
| IC chip AID | AID 1 |

VEHICLE AND ELECTRONIC TOLL COLLECTION SYSTEM

CROSS REFERENCE TO RELATED APPLICATION

The present application claims priority to Korean Patent Application No. 10-2023-0145154, filed Oct. 27, 2023, the entire contents of which is incorporated herein for all purposes by this reference.

BACKGROUND

Field

The disclosure relates to a vehicle and electronic toll collection system designed for the automatic settlement of toll fees at tollgates.

Description of the Related Art

An electronic toll collection system (ETCS) (e.g., HI-PASS device) is a system that automatically settle toll fees for vehicles passing through tollgates using a standardized application interface method based on the dedicated short range communication (DSRC) protocol.

The ETCS utilize dedicated short-range communication (DSRC) to enable automatic toll information exchange between roadside equipment (RSE) and vehicle-mounted terminal devices (referred to as on-board equipment, terminal device for ETCS, or HI-PASS device).

When a vehicle enters the tollgate, the ETCS utilizes a vehicle classification device to identify the type of vehicle, communicates with the vehicle-mounted terminal device using antennas, and transmits toll fee information corresponding to the vehicle type to the vehicle-mounted terminal device.

Upon identifying the type of vehicle entering the tollgate using a vehicle classification device, the ETCS communicates with the vehicle-mounted terminal device using antennas, identifies road information used by the vehicle through communication with the vehicle-mounted terminal device, obtains toll fee information for road usage based on the recognized road information and vehicle type, and delivers the obtained toll fee information to the vehicle-mounted terminal device.

In the past, toll fees were settled using a postpaid or prepaid card inserted into the slot on the vehicle-mounted terminal device. This approach presented certain drawbacks, including the inconvenience of requiring drivers to obtain a postpaid or prepaid card from a card issuer for automatic toll payment and the necessity for users to manually insert the obtained card into the vehicle-mounted terminal device. Furthermore, for prepaid cards, there was the inconvenience of requiring users to reload the card. Additionally, there was a risk of losing the postpaid or prepaid card inserted into the vehicle-mounted terminal device.

In response to these drawbacks, vehicle-mounted terminal devices utilizing embedded integrated circuit (IC) chips for toll payment are currently under research and development.

SUMMARY

In one embodiment, a vehicle capable of allowing a first user to share the IC chip for toll payment with a second user and a server communicating with the vehicle is provided.

According to one aspect, a vehicle includes a first terminal device comprising an integrated circuit (IC) chip configured to perform payment, an input unit configured to receive user input, a second terminal device configured to provide a user interface, a memory configured to store first login information of a first user and second login information of a second user, and a communication device configured to communicate with a mobile device of the first user and a server. According to one aspect, the second terminal device of the vehicle sets the IC chip as a sharable chip based on the first login information of the first user and sharing condition information for the IC chip received via the input unit, transmits, based on the second login information of the second user and sharing request information received via the input unit, the received sharing request information to the mobile device, and determines, upon receiving sharing approval information and the sharing condition information from the mobile device, whether to activate the IC chip of the first terminal device based on the sharing condition information.

According to one aspect, the sharing condition information of the vehicle includes at least one of payment limit information and payment availability time information for the IC chip of the first terminal device.

According to one aspect, the second terminal device of the vehicle controls login of the second user based on the received second login information of the second user and transmits, upon receiving route information via the input unit while the second user is logged in, the received route information to the mobile device.

According to one aspect, the second terminal device of the vehicle acquires identification information of a tollgate expected to be passed by the vehicle based on the received route information, acquires predicted toll fee information and predicted passage time information based on the acquired identification information of the tollgate, and determines whether to activate the IC chip of the first terminal device based on the acquired predicted toll fee information, the predicted passage time information, and the shared condition information.

According to one aspect, the second terminal device of the vehicle transmits a deactivation command for the IC chip to the first terminal device when at least one of the acquired predicted toll fee information and predicted passage time information is not satisfied the sharing condition, and transmits an activation command for the IC chip to the first terminal device when both the acquired predicted toll fee information and predicted passage time information are satisfied the sharing condition information.

According to one aspect, the sharing condition information of the vehicle further includes identification information of the IC chip of the first terminal device, the first login information of the first user, the second login information of the second user, and identification information of the vehicle, the second terminal device transmits the sharing condition information to the server. According to one aspect, the second terminal device of the vehicle transmits the sharing condition information to the server.

According to one aspect, the second terminal device of the vehicle transmits the received second login information of the second user to the server, receives sharing configuration information of the second user from the server, and determines whether to activate the IC chip of the first terminal device based on the received sharing configuration information of the second user. According to one aspect, the sharing configuration information of the second user of the vehicle includes the identification information of the first user sharing the IC chip with the second user and the sharing condition information.

According to one aspect, the second terminal device of the vehicle transmits activation information or deactivation information of the IC chip of the first terminal device to the mobile device and the server.

According to one aspect, the second terminal device of the vehicle transmits, upon receiving the first login information of the first user and payment registration information of the IC chip from the mobile device, the received first login information of the first user and payment registration information of the IC chip to the first terminal device. According to one aspect, the first terminal device of the vehicle determines whether to issue a card through the IC chip based on the received first login information of the first user and payment registration information of the IC chip.

According to one aspect, the second terminal device of the vehicle transmits, upon receiving the first login information of the first user and payment registration information of the IC chip from the input unit, the received first login information of the first user and payment registration information of the IC chip to the first terminal device.

According to one aspect, the second terminal device of the vehicle transmits, upon completion of card issuance through the IC chip, the first login information of the first user received through the input unit and the payment registration information to the server. According to one aspect, the second terminal device of the vehicle transmits an activation command for the IC chip to the first terminal device based on the first login information of the first user received through the input unit and the payment registration information of the IC chip.

According to one aspect, the first terminal device of the vehicle compares, upon receiving identification information of the vehicle from the second terminal device, the received first identification information of the vehicle and pre-stored second identification information of the vehicle and determines to deactivate the IC chip based on the received first identification information of the vehicle and the pre-stored second identification information of the vehicle being different.

According to one aspect, the second terminal device of the vehicle transmits, upon receiving the first login information of the first user from the mobile device, an activation command for the IC chip to the first terminal device. According to one aspect, the first terminal device pays, when passing through a tollgate, toll fee using the IC chip.

According to one aspect, an electronic toll collection system includes a mobile device of a first user, a vehicle comprising a memory configured to store first login information of the first user and second login information of a second user and an integrated circuit (IC) chip configured to perform payment, and a server configured to communicate with the mobile device and the vehicle. According to one aspect, the server of the electronic toll collection system sets, upon receiving the first login information of the first user and sharing condition information for the IC chip from the vehicle, the IC chip as a sharable chip, transmits, upon receiving the second login information of the second user and sharing request information from the vehicle, the received sharing request information to the mobile device, and transmits, upon receiving sharing approval information and sharing condition information from the mobile device, the activation command or deactivation command for the IC chip to the vehicle based on the received sharing condition information.

According to one aspect, the sharing condition information of the electronic toll collection system includes payment limit information and payment availability time information of the IC chip of the vehicle, identification information of the IC chip, the first login information of the first user, the second login information of the second user, and identification information of the vehicle.

According to one aspect, the server of the electronic toll collection system sets, when receiving the login information of the second user and sharing request information from the vehicle and sharing approval information and sharing condition information from the mobile device, the IC chip as a sharable chip, generates sharing configuration information for the IC chip based on the sharing condition information, and transmits the sharing configuration information generated for the IC chip to the vehicle.

According to one aspect, the server of the electronic toll collection system stores, upon receiving status information of the IC chip from the vehicle, the received status information of the IC chip.

According to one aspect, the server of the electronic toll collection system transmits the activation command of the IC chip after identifying the first user based on the first login information of the first user and payment registration information of the IC chip received from the vehicle or the mobile device.

According to one aspect, the server of the electronic toll collection system stores payment transaction information for payments made through the IC chip by each user based on the login information received from the vehicle.

According to one aspect, the server of the electronic toll collection system compares, upon receiving identification information of the vehicle and identification information of the IC chip from the vehicle, the received identification information of the vehicle, the received identification information of the IC chip, and the identification information of the IC chip matched with pre-stored identification of the vehicle and controls the transmission of the deactivation command for the IC chip.

BRIEF DESCRIPTION OF THE DRAWINGS

FIG. 8 illustrate an example of shared condition information stored in a first server;

DETAILED DESCRIPTION

Figure 1:
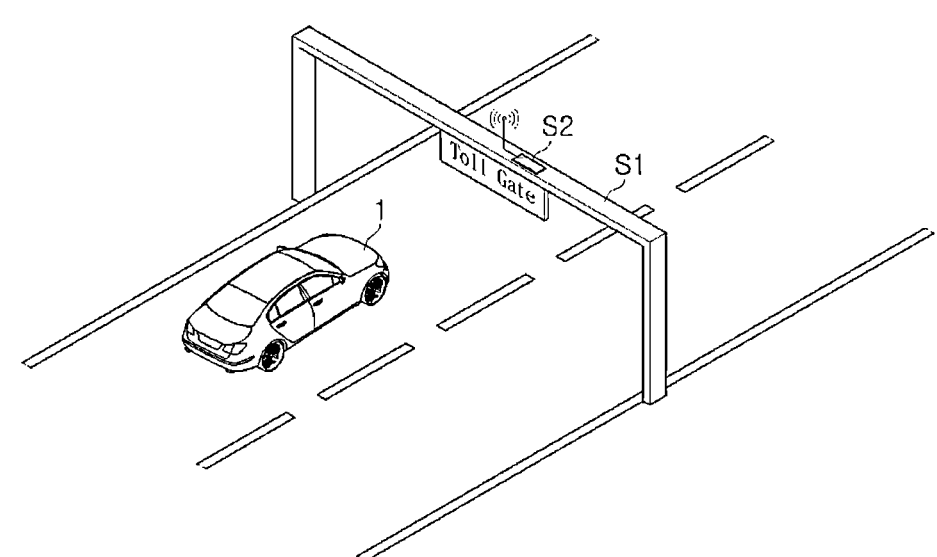
FIG. 1 is a block diagram illustrating a configuration of an electronic toll collection system (ETCS) including a vehicle according to an embodiment.

Throughout the specification, the same reference numerals refer to the same components. This specification does not describe all elements of the embodiments of the disclosure, and well-known descriptions in the art or repeated descriptions between the embodiments of the disclosure are omitted. The term "unit, module, member, or block" used in the specification may be implemented by software or hardware, and according to embodiments, it is also possible that a plurality of "units, modules, members, or blocks" are implemented as one component, or that one "part, module, member, or block" includes a plurality of components.

Throughout the specification, when a part is "connected" to another part, this includes a case of being directly connected as well as being connected indirectly, and indirect connection includes connecting through a wireless communication network.

Also, when a part is said to "comprise" a certain component, this means that other components may be further included instead of excluding other components unless specifically stated otherwise.

Throughout the specification, when one member is positioned "on" another member, this includes not only the case where one member abuts another member, but also the case where another member exists between the two members.

Terms such as first and second are used to distinguish one component from other components, and the component is not limited by the above-described terms.

A singular expression includes a plural expression unless the context clearly has an exception.

In each of steps, an identification code is used for convenience of description, and the identification code does not describe the order of each of the steps, and each of the steps may be performed differently from the specified order, unless a specific order is explicitly stated in the context.

Hereinafter, the principle and embodiments of the disclosure will be described with reference to accompanying drawings.

FIG. 1 is a block diagram illustrating a configuration of an electronic toll collection system (ETCS) including a vehicle according to an embodiment.

With reference to FIG. 1, the electronic toll collection system (ETCS) according to an embodiment may include a tollgate S1 or roadside equipment (RSE) S2 provided at one side of the tollgate S1, and a vehicle 1 passing through the tollgate S1.

The electronic toll collection system (ETCS) is a system that automatically exchanges toll fee information between the roadside equipment S2 and the vehicle 1 based on dedicated short-range communication technology.

The roadside equipment S2 may include a transceiver antenna for communication with the vehicle 1. The roadside equipment S2 may automatically request toll payment from the vehicle 1 through communication with the vehicle 1.

The roadside equipment S2 may communicate with the vehicle 1, identify the type of vehicle passing through the tollgate S1, and request toll payment corresponding to the recognized type from the vehicle 1.

The type of vehicle is related to the size of the vehicle, such as small, medium, and large.

The roadside equipment S2 may communicate with the server (not shown) of the road management agency.

The roadside equipment S2 may transmit identification information of the tollgate S1, passage time information, vehicle identification information, and toll fee information to the server (not shown).

The vehicle 1 receives electromagnetic waves emitted from at least one of the roadside equipment S2 and the server (not shown) through an antenna (not shown), and converts the received electromagnetic waves into electrical signals.

The vehicle 1 demodulates the received electromagnetic waves into electrical signals through the antenna (not shown), generates control signals corresponding to the demodulated electrical signals, and utilizes the generated control signals to control the vehicle 1.

The vehicle 1 may receive first toll information from the roadside equipment S2. The first toll information, which refers to the details captured when a vehicle passes through the tollgate, may include identification information of the tollgate, location information of the tollgate, passage time information, and toll fee information.

The vehicle 1 may automatically pay toll fee based on the received first toll information.

Figure 2:
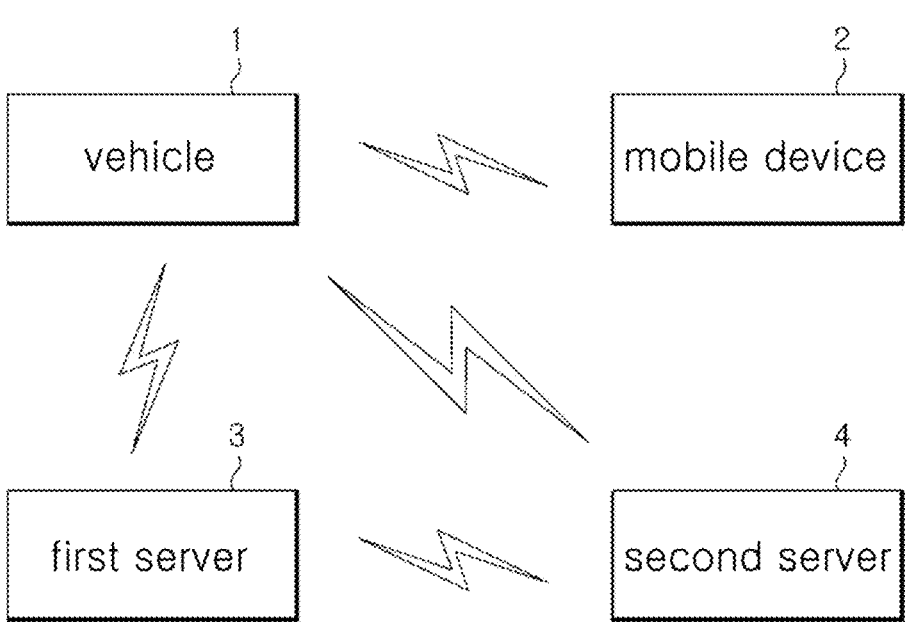
FIG. 2 is a communication diagram according to an embodiment.

FIG. 2 is a communication diagram according to an embodiment.

The vehicle 1 may communicate with a mobile device 2, a first server 3, and a second server 4.

The vehicle 1 may communicate with the mobile device 2 to receive information from the mobile device 2, process the received information from the mobile device 2, display the received or processed information from the mobile device 2, and transmit the information stored in the vehicle 1 and vehicle operation information to the mobile device 2. Here, the mobile device 2 may be the mobile device of the first user.

The vehicle 1 may process information received from the first server 3, display information received from the first server 3, and transmit information stored in the vehicle 1 and vehicle operation information to the first server 3.

The vehicle 1 may process information received from the second server 4, display information received from the second server 4, and transmit information stored in the vehicle 1 and vehicle operation information to the second server 4.

The vehicle 1 may provide connected car services (CCS) to users.

Connected car services encompass remote vehicle start and diagnostics, making phone calls, sending messages and emails, accessing real-time traffic information, and receiving emergency assistance, all facilitated through the vehicle's internal or nearby network or Internet connection.

The vehicle 1 may store the identification information of users who have subscribed to connected car services. This identification information of subscribed users may include login information for the application used for the connected car services.

Subscription to connected car services may be done through the second terminal device (AVN terminal device) of the vehicle or the mobile device 2.

Connected car services may be provided through applications on the second terminal device of the vehicle and mobile device 2.

The vehicle 1 may control at least one of the remote control service and automatic toll payment service through the connected car services.

Additionally, the vehicle 1 may perform user authentication through the connected car services.

The vehicle 1 may receive and store the identification information of a plurality of users. For example, the vehicle 1 may receive and store the identification information of the first user, receive and store the identification information of the second user, and receive and store the identification information of the third user.

At least two or more users among the plurality of users may share the IC chip installed in the vehicle. In this case, the vehicle may match and store the identification information of users who share the IC chip.

The mobile device 2 may communicate with the vehicle 1 through at least one of the Bluetooth low energy (BLE) module, ultra-wide band (UWB) module, and near field communication (NFC) module.

The mobile device 2 may communicate with the first server 3 and the second server 4.

The mobile device 2 may remotely control the vehicle 1 and perform payment for services used by the first user or goods purchased by the first user.

The mobile device 2 may have the first application installed for automatic toll payment services and the second application installed for remote control services for the vehicle 1. Here, the remote control services may include digital key services.

The first and second applications may also be implemented as a single application.

The first and second applications may interoperate with each other.

Subscription may be performed through the first or second application installed on the mobile device 2 in such a way as to register and store the identification information of the mobile device, identification of the first user, the identification of the vehicle, and payment subscription information of the first user.

The identification information of the mobile device 2 is unique identification information of the mobile device 2 and includes at least one of the phone number, wireless-fidelity media access control (Wi-Fi MAC) address, serial number, or international mobile equipment identity (IMEI) of the mobile device 2.

The identification information of the mobile device 2 may also include Bluetooth identification information (BTID).

The identification information of the first user includes at least one of the name, date of birth, resident registration number, gender, phone number, home address, work address, driver's license information, and email address of the first user.

The identification information of the first user may also include the subscriber ID registered during subscription through the first or second application. The subscriber ID registered during subscription may be used for login purposes in the first or second application.

The identification information of the vehicle 1 may include the type, model, serial number, chassis number, license plate information, and powertrain information (e.g., hybrid, electric, internal combustion, hydrogen).

The type of vehicle may be distinguished based on factors such as engine displacement, length, width, and height of the vehicle. In this case, vehicles may be categorized as compact cars, small cars, medium-sized cars, and large cars.

The payment registration information of the first user may include card information and account information.

The card information may include at least one of the card issuer, card number, expiration date, card personal identification number (PIN), and security code (e.g., card verification code (CVC)).

The account information may include bank type, account number, account PIN, and account owner name.

The payment registration information of the first user may also include information such as the maximum daily payment amount, maximum single payment amount, and maximum number of daily payments.

The mobile device 2, upon completing subscription through the second application, may receive and store the digital key (or electronic key) of the vehicle from the manufacturer's server (not shown) and transmit the stored digital key to the vehicle 1. The digital key may include the identification information, authentication information, and vehicle control authority information of the mobile device 2, and may further include the identification information of the vehicle.

The mobile device 2 may receive the identification information of the second user from the vehicle. That is, the mobile device 2 may receive the identification information of the second user, who has subscribed through the first application, as the identification information of the sharer for sharing the IC chip of the vehicle.

The mobile device 2 may receive sharing approval information or sharing rejection information via an input interface (not shown) and transmit the received sharing approval information or sharing rejection information to the vehicle 1 or the first server 3.

In response to receiving the sharing approval information from the first user via the input interface (not shown) of the mobile device 2, the mobile device 2 may store the received identification information of the second user as sharer identification information.

The first user may be the owner of the vehicle, while the second user may be a sharer who receives approval from the first user to control the vehicle and uses the vehicle. The second user may be a sharer who receives approval from the first user to share the IC chip installed in the vehicle.

The mobile device 2 may receive information on the route selected by the second user from the vehicle 1 and display the received route information.

The mobile device 2 may receive the second toll information from the vehicle 1 and display the received second toll information. Here, the second toll information refers to the information obtained based on the route selected by the second user and may include the identification information of the tollgate predicted to be passed by the vehicle, the location information of the tollgate, toll fee information, and passage time information.

Upon receiving the activation or deactivation information of the IC chip from the vehicle 1, the mobile device 2 may display the received activation or deactivation information of the IC chip.

The mobile device 2 may receive the sharing condition information of the IC chip through the input interface (not shown) of the mobile device 2. The mobile device 2 may transmit the sharing condition information of the IC chip to at least one of the first server 3, the second server 4, and the vehicle 1.

The sharing condition information may include the identification information of the requester (i.e., the identification information of the second user), the identification information of the provider (i.e., the identification information of the first user), the payment availability time information for paying with the IC chip, payment limit information, vehicle identification information, and IC chip identification information (application identifier (AID)). The vehicle identification information may include the vehicle identification number (VIN).

The sharing condition information may further include route information, identification information of tollgates, and location information of tollgates.

The mobile device 2 may be implemented as a computer or portable terminal that can connect to the vehicle 1 via a network.

Here, the computer may, for example, encompass laptop, desktops tablets and slate personal computers (PCs) equipped with web browsers, while the portable terminal may, for example, encompass wireless communication devices ensuring portability and mobility, such as handheld wireless communication devices based on personal communication system (PCS), global system for mobile communications (GSM), personal digital cellular (PDC), personal handyphone system (PHS), personal digital assistant (PDA), international mobile telecommunication-2000 (IMT-2000), code division multiple access-2000 (CDMA-2000), wide-band-code division multiple access (W-CDMA), and wireless broadband (WiBro), smartphones, as well as wearable devices like watches, rings, bracelets, anklets, necklaces, glasses, contact lenses, or head-mounted displays (HMDs).

The first server 3 may be a server of a company issuing and managing credit cards (i.e., HI-PASS cards) for toll fee payment.

The first server 3 may be a server of a company issuing and managing credit cards for payment of goods or services, including toll fees.

The first server 3 may be a server of an institution responsible for toll collection and management.

The first server 3 may store the payment registration information of the first user and may transmit the payment registration information of the first user to the vehicle 1 and may also transmit an IC chip activation or deactivation commands to the vehicle 1.

The first server 3 may store sharing condition information and transmit the sharing condition information to the vehicle 1.

The second server 4 may be a server located at a service center, manufacturer, etc., involved in managing the vehicle 1. The second server 4 may also serve as an application (app) server providing services related to the vehicle 1, a telematics server, or a platform server.

The application associated with the vehicle 1 may include the first application for automatic toll payment services and may additionally include the second application for remote control services for the vehicle 1.

The second server 4 may store the identification information of the first user who subscribed through the first application, the identification information of the vehicle, the identification information of the first user's mobile device, and the payment registration information of the first user, and may also store the login information of the first user.

The second server 4 may store the identification information of the first user who subscribed through the second application, the identification information of the vehicle, and the identification information of the first user's mobile device, and may also store the login information of the first user.

The second server 4 may further store the identification information of the second user who subscribed through the first application and may also store the login information of the second user.

Figure 3:
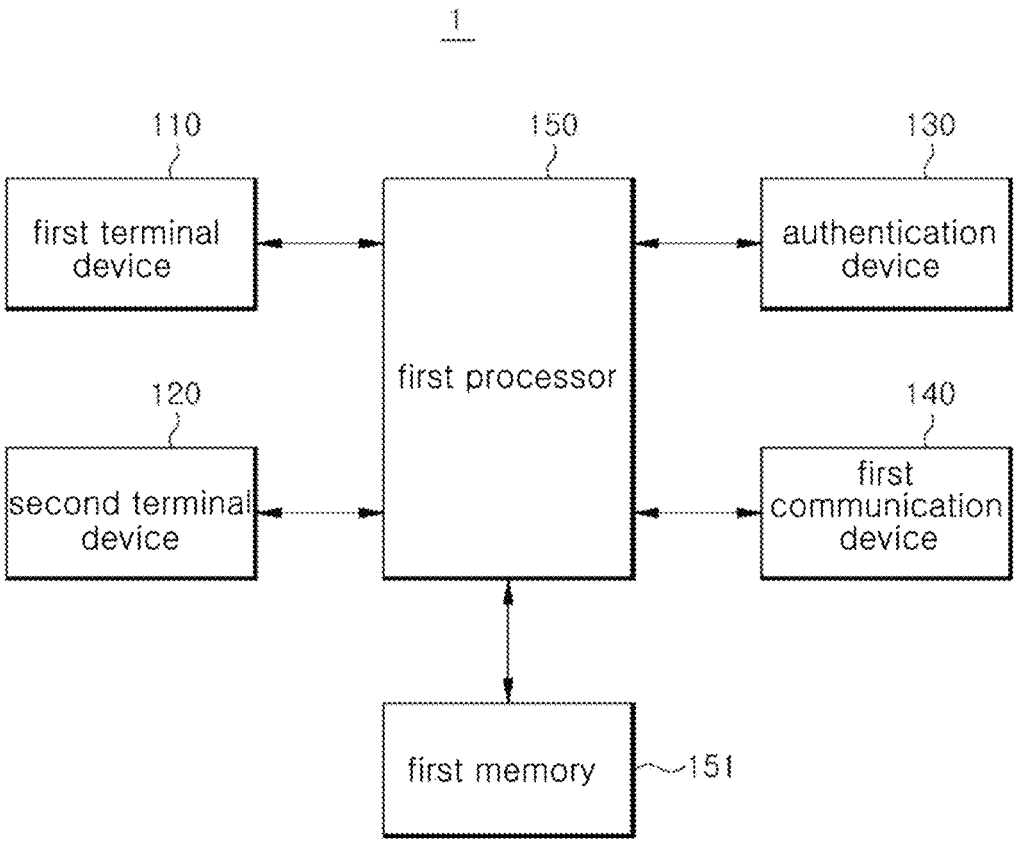
FIG. 3 is a control block diagram of a vehicle according to an embodiment.
Figure 4:
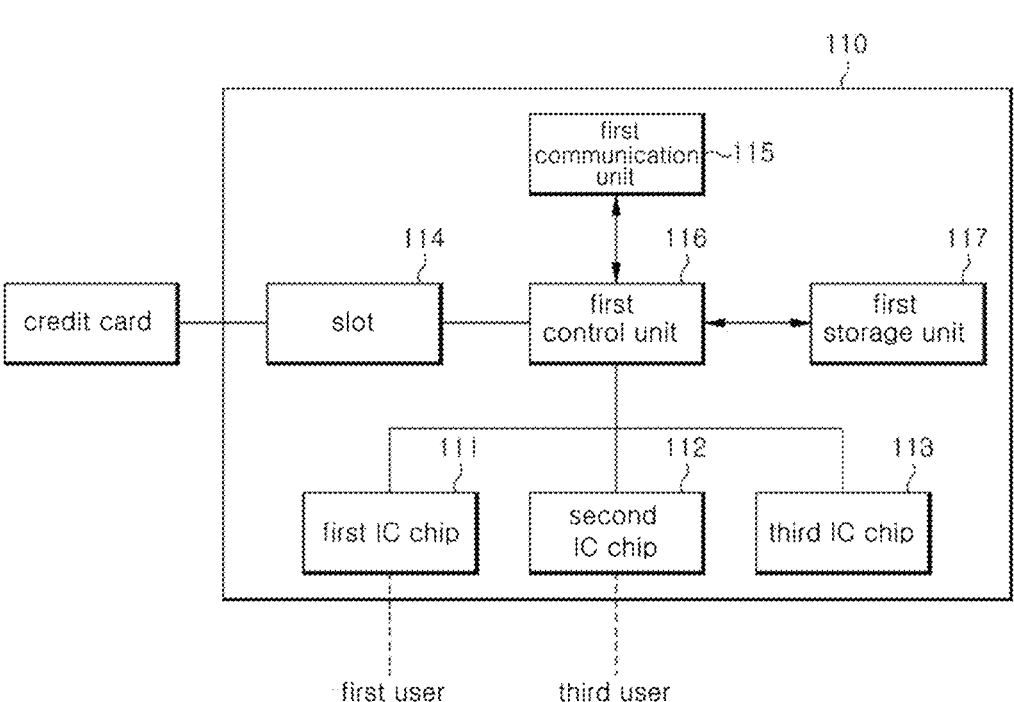
FIG. 4 is a control block diagram of a first terminal device installed in a vehicle according to an embodiment.
Figure 5:
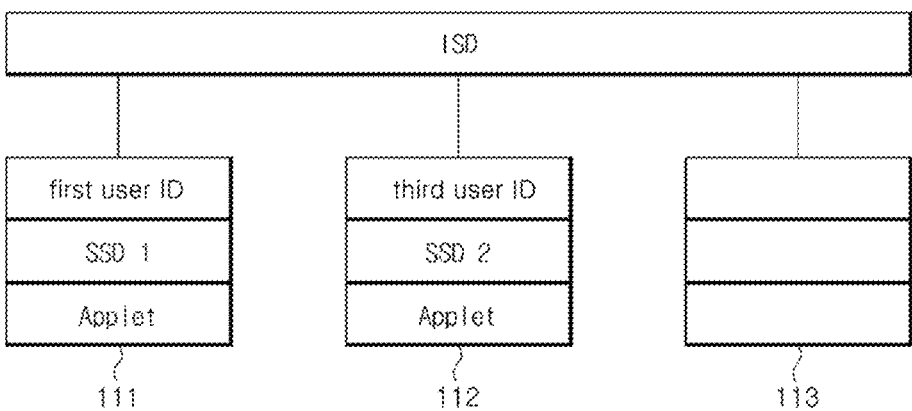
FIG. 5 is a diagram illustrating IC chips of the first terminal device of FIG. 4.
Figure 6:
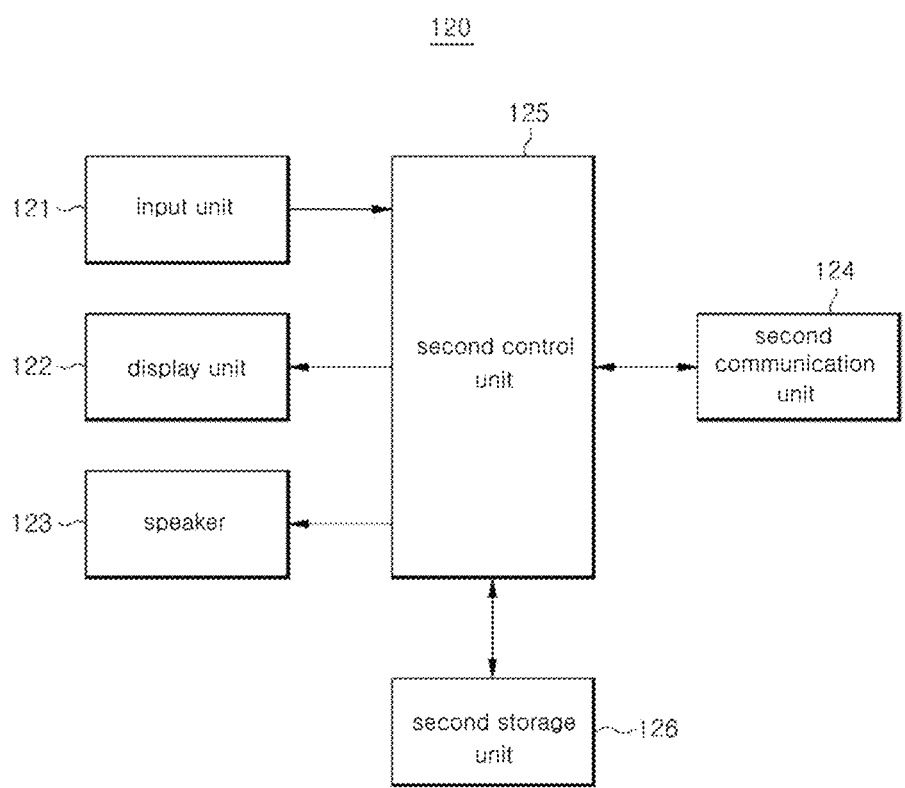
FIG. 6 is a control block diagram of a second terminal device installed in a vehicle according to an embodiment.

FIG. 3 is a control block diagram of a vehicle according to an embodiment, and the description thereof is made with reference to FIGS. 4 to 6.

FIG. 4 is a control block diagram of a first terminal device installed in a vehicle according to an embodiment, FIG. 5 is a diagram illustrating IC chips of the first terminal device of FIG. 4, and FIG. 6 is a control block diagram of a second terminal device installed in a vehicle according to an embodiment.

The vehicle 1 includes a first terminal device 110, a second terminal device 120, an authentication device 130, a first communication device 140, a first processor 150, and a first memory 151.

To differentiate between the components of the vehicle 1 and the components of the first server 3 that share the same names, 'first' will be added to the components of the vehicle, and 'second' will be added to the components of the first server 3.

The first terminal device 110 may be installed flush-mounted or surface-mounted on the dashboard.

The first terminal device 110 may also be installed on the rearview mirror inside the vehicle or on the front windshield glass.

The first terminal device 110 may determine whether the vehicle identification information received from the first processor 150 matches the pre-stored vehicle identification, and based on the identification information matching or mismatching, control the activation or deactivation of multiple IC chips.

The first terminal device 110 may transmit the payment registration information of multiple IC chips to the second terminal device 120 when controlling the activation of the IC chips. The payment registration information of each IC chip may include the application identifier (AID).

The first terminal device 110 may receive user identification information from the second terminal device 120 and control the activation of the IC chip corresponding to the received user identification information and the deactivation of the remaining IC chips.

Upon receiving payment registration information of the first user and card issuance command from the first server 3 or the first processor 150, the first terminal device 110 may control the issuance of a card for an IC chip using the received payment registration information of the first user.

Upon completion of the issuance of the card for the IC chip, the first terminal device 110 may match and store the identification information of the first user by matching it with the identification information of the IC chip and the payment registration information.

The first terminal device 110 may communicate with the roadside base station S2 when entering the tollgate S1. Here, the first terminal device 110 may receive the first toll information from the roadside base station S2, and upon receiving the first toll information, proceed with toll payment.

The first terminal device 110 may transmit the toll information to the first server 3 when paying toll fees. The first toll information may include toll fee information, tollgate identification information, tollgate location information, passage date information, passage day information, and passage time information.

The first terminal device 110 may also receive the tollgate identification information or tollgate location information from at least one of the second terminal device 120 or the first communication device 140 when entering the tollgate.

When transmitting the first toll information to the first server 3, the first terminal device 110 may also transmit the identification information and payment registration information of the first user to the first server 3 and the second server 4.

The first terminal device 110 may store the first toll information. When the vehicle is used by the first user, the first terminal device 110 may store the first toll information by matching it with the identification information of the first user. When the vehicle is used by the second user, the first terminal device 110 may store the first toll information by matching it with the identification information of the second user.

As shown in FIG. 4, the first terminal device 110 may include one or more IC chips 111, 112, and 113, a slot 114, a first communication unit 115, a first control unit 116, and a first storage unit 117.

Each IC chip is an integrated circuit chip made of semiconductor material and is unaffected by magnetic materials. Each IC chip may be an embedded card, storing card information, rather than a physical credit card requiring insertion into a slot.

The card information may include at least one of the card issuer, card number, expiration date, card personal identification number (PIN), and security code (e.g., card verification code (CVC)).

Each IC chip may be an embedded card storing the account information of the user. Here, the account information may include bank name, account number, account password, and account owner name.

The card information and account information stored in the IC chip may be payment registration information.

The payment registration information may also include information such as the maximum daily payment amount, maximum single payment amount, and maximum number of daily payments.

IC chips store payment registration information and user identification information in an encrypted format. IC chips may include a security processor.

IC chips may store public certificates corresponding to the private key of the public key infrastructure.

IC chips may include a power terminal, data transceiver terminal, and clock transceiver terminal.

The description is based on the assumption that there are three IC chips.

Each IC chip may store a unique vehicle number encrypted to protect the IC chip from theft, forgery, and tampering, instead of the license plate number of the vehicle.

As shown in FIG. 5, each IC chip 111, 112, and 113 may include the issuer security domain (ISD) pre-installed permanently by the vehicle manufacturer and the supplementary security domain (SSD) installed by the card issuer providing payment services.

The structure of the security domain (SD) containing ISD and SSD may follow the global platform (GP) card specification.

Each IC chip 111, 112, and 113 may process payments based on the payment registration information registered through the first server 3 for each user.

For example, when the identification information of the first user is received by the first terminal device, the first terminal device may activate the first IC chip 111 corresponding to the identification information of the first user, allowing toll payments to be made through the first IC chip 111 based on the toll fee information received from the roadside base station S2 as the vehicle passes through the tollgate S1.

When the identification information of the third user is received by the first terminal device, the first terminal device may activate the second IC chip 112 corresponding to the identification information of the third user, allowing toll payments to be made through the second IC chip 112 based on the toll fee information received from the roadside base station S2 as the vehicle passes through the tollgate S1.

The slot 114 is where a physical card is inserted. The slot 114 may read the information from the physical card and transmit the read information to the first control unit 116.

The first communication unit 115 may transmit and receive information between the components within the first terminal device 110.

The first communication unit 115 may perform communication by connecting to the vehicle network (NT).

The first communication unit 115 may send information to the first processor 150 and receive information from the first processor 150.

The first communication unit 115 may communicate with external electronic devices, such as the roadside base station S2, the first server 3, and the second server 4, wirelessly.

The first control unit 116 may communicate with the first communication device 140 to identify the vehicle 1 and the first user, determine whether the identified first user matches the user of the identified vehicle, and when a successful user authentication information is received from at least one of the second terminal device 120 and the authentication device 130 in a state where the identified first user matches the user of the identified vehicle, control the activation of the first IC chip 111 corresponding to the identified first user.

The first control unit 116 may verify the login information of the first user logged in through the second terminal device 120 of the vehicle, confirm the payment registration information corresponding to the verified login information of the first user, and based on the payment registration information of the first user confirmed and stored in the first storage unit 117, control the activation of the first IC chip 111. That is, the first control unit 116 may control the activation of the first IC chip 111 corresponding to the login information of the first user.

The first control unit 116, upon receiving the login information of the second user through the second terminal device 120 of the vehicle, verifies the identification information of the received second user based on the received login information and determines whether the second user is a sharing requester based on the verified identification information of the second user.

When it is determined that the second user is a sharing requester, the first control unit 116 verifies the identification information of the first user who approved the sharing of the IC chip with the second user, and based on the verified identification information of the first user, control the activation of the first IC chip 111 corresponding to the payment registration information or the identification information of the IC chip of the first user. That is, the first control unit 116 may control the activation of the first IC chip 111 corresponding to the identification information of the first user when the second user logs in.

As shown in FIG. 5, the first control unit 116, upon receiving the first card issuance command, security key, and payment registration information via the first processor 150, may store the payment registration information on the first IC chip 111 among multiple IC chips using the received security key.

That is, the first control unit 116 may generate an SSD and an applet corresponding to the payment registration information on the first IC chip 111 using the security key, enabling the issuance of the first IC chip 111 as a new first card. Here, the first card may be a card in the name of the first user.

Here, the generation of the SSD and applet may be performed by the ISD.

The security key corresponds to the key authorizing card issuance and may be issued by the personal secure application module (Persa).

PerSAM may serve as a security device used for securely transmitting keys for card (electronic money) issuance and take the form of a card-shaped device that must be used in accordance with a predetermined procedure. That is, Per-SAM is a module that contains the key information required for issuance and may be provided by the road administration agency that manages the electronic toll collection system (ETCS).

Upon issuance of the first IC chip 111 as the first card, the first control unit 116 may generate initialization inter-sector electronic purse (IEP) data for the first card.

The initialization IEP data of the first card may include the transaction serial number of the first card, a random number generated by the first card, the identifier of the issuer of the first card, the identifier of the first card, the balance of the first card, the identifier of the road administration agency, the identifier of the card service, and the signature value generated by the first card.

The first control unit 116 may encrypt the transaction serial number of the first card, the random number generated by the first card, and the key stored in the first card to generate a session key.

The first control unit 116 may encrypt the identifier of the issuer of the first card, the identifier of the first card, the balance of the first card, and the session key to generate a signature value.

The first control unit 116 may recognize the entry of the tollgate S1 based on the identification information received from the roadside base station S2 when the vehicle 1 enters the tollgate S1 and may acquire the identification information of the tollgate S1.

The first control unit 116 may control the first communication unit 115 to transmit the initialization IEP data of the first card to the roadside base station 15 upon recognizing tollgate entry.

When a user logged in through the second terminal device is determined to be the first user, the first control unit 116 may select the first card as an instance and perform communication for toll payment using the selected first card, enabling toll payment.

When a user logged in through the second terminal device is determined to be the second user, the first control unit 116 may select the first card of the first IC chip as an instance and perform communication for toll payment using the selected first card, enabling toll payment.

When a deletion request and an authorization key of the first card are received through the first processor 150, the first control unit 116 may use the authorization key to delete the payment registration information of the first user stored in the first IC chip 111.

When deleting payment registration information registered on any IC chip, the first control unit 116 may delete the SSD and applet.

The authorization key is a key that grants the authority to delete a card and may be issued by PerSAM. The card deletion request may include an SSD deletion command and an applet deletion command.

As shown in FIG. 5, the first control unit 116, upon receiving the second card issuance request, security key, and payment registration information of the third user via the first processor 150, may store the payment registration information of the third user on the second IC chip 112 not yet issued among multiple IC chips using the received security key.

That is, the first control unit 116 may generate an SSD and an applet corresponding to the payment registration information of the third user on the second IC chip 112 using the security key, enabling the issuance of the second IC chip 112 as a new second card. Here, the second card may be a card in the name of the third user.

When a user logged in through the second terminal device 120 is determined to be the third user, the first control unit 116 may select the second card of the second IC chip 112 as an instance and perform communication for toll payment using the selected second card, enabling toll payment.

Upon completion of toll payment, the first control unit 116 may transmit the first toll information to the first processor 150, the first server 3, or the second server 4.

The first control unit 116 may include at least one memory storing a program performing the aforementioned operations and subsequent operations, as well as at least one processor executing the stored program. When there are a plurality of memories and processors, they may be integrated on a single chip or may be provided in physically separate positions.

The first storage unit 117 may store user identification information by matching it with payment registration information for each user.

The first terminal device 117 may store the first toll information.

The first storage unit 117 may store the program performing the operations of the first control unit 116. The first control unit 116 may execute the program stored in the first storage unit 117.

The first storage unit 117 may be implemented using at least one of non-volatile memory components such as cache, read only memory (ROM), programmable ROM (PROM), erasable programmable ROM (EPROM), electrically erasable programmable ROM (EEPROM), and flash memory, or volatile memory components such as random access memory (RAM), or storage media like hard disk drives (HDD), or compact disc-ROM (CD-ROM), without being limited to these.

The second terminal device 120 may be installed flush-mounted or surface-mounted on the dashboard.

The second terminal device 120 may serve as a user interface device to receive user inputs and provide information about various functions performed in the vehicle 1 as well as information for user convenience.

The second terminal device 120 may perform at least one of the audio mode, video mode, or navigation mode. The second terminal device 120 may serve as a terminal device for audio video navigation (AVN).

The second terminal device 120 may be integrated with the mobile device 2 to receive and display information from the mobile device 2.

The second terminal device 120 may include applications for interoperability with the mobile device 2. The second terminal device 120 may also perform user authentication in conjunction with a mobile device 2.

The second terminal device 120 may include a first application for automatic toll payment services and a second application for remote control services. Through this, the second terminal device 120 may perform remote services for user convenience and automatic toll payment services.

The second terminal device 120 may perform user authentication.

The second terminal device 120 may also transmit the identification information of the identified user and success or failure information of user authentication to at least one of the first terminal device 110 and the first processor 150.

The second terminal device 120 may store the login information of the first user who subscribed through the first application or the second application. The login information may include the subscriber ID of the first user and may further include subscription authentication information of the first user. For example, the subscription authentication information may include a password or pattern.

The second terminal device 120 may control the execution of the first application or the second application based on the comparison between the stored login information of the first user and the received login information of the first user through the first application or the second application.

The second terminal device 120 may store the login information of the second user who subscribed through the first application or the second application.

The second terminal device 120 may control the execution of the first application or the second application based on the comparison between the stored login information of the second user and the received login information of the second user through the first application or the second application.

Upon receiving the login information of the first user and the identification information of the second user as the sharing requester, the second terminal device 120 may authorize the sharing requester to share the IC chip based on the identification information of the second user received through the input unit 121.

The second terminal device 120 may acquire at least one of navigation information, the current location information of the vehicle, the location information of the tollgate, or the identification information of the tollgate when the first user is logged in and transmit at least one of the acquired navigation information, the current location information of the vehicle, the location information of the tollgate, or the identification information of the tollgate to the first terminal device 110.

The second terminal device 120 may transmit the route information and second toll information selected by the second user to the mobile device 2 when the second user is logged in.

Here, the second toll information refers to the information obtained based on the route information and may include the identification information of the tollgate predicted to be passed by the vehicle, the location information of the tollgate, toll fee information, and passage time information.

The second terminal device 120 may transmit the payment registration information of the IC chip and the user identification information received from the first terminal device 110 to the first server 3. The payment registration information of the IC chip may include AID.

Upon receiving the user confirmation completion information, identification information of the IC chip, and the user identification information from the first server 3, the second terminal device 120 may transmit the identification information of the IC chip and activation command to the first terminal device 110.

The second terminal device 120 may further receive the identification information of the second user to be shared with the first user and the sharing condition information related to the second user from the first server 3 or the mobile device 2. The second terminal device 120 may match the identification information of the second user and the shared condition information to store as sharing configuration information.

Upon receiving the login information of the second user via the input unit 121, the second terminal device 120 may transmit the identification information of the second user, the identification information of the first user, and the payment registration information of the IC chip to the first server 2.

When the activation command for the IC chip corresponding to the identification information of the first user is received from the first server 3, the second terminal device 120 may transmit the activation command for the IC chip to the first terminal device 110.

The second terminal device 120 may transmit the route information selected by the second user to the mobile device 2, receive the sharing approval or rejection information from the mobile device 2, and transmit the identification information of the IC chip and the activation command for the IC chip to the first terminal device 110 in response to the receipt of sharing approval information, and transmit the identification information and deactivation command for the IC chip to the first terminal device 110 in response to the receipt of sharing rejection information.

The second terminal device 120 may receive the identification information and status information of the IC chip from the first terminal device, display the received information, and transmit the identification information and status information of the IC chip to the mobile device 2. The status information of the IC chip may include the activation status or deactivation status of the IC chip.

In the state where the second user is logged in, the second terminal device 120 may transmit the activation command for the IC chip to the first terminal device 110 in response to the toll information received from the first terminal device satisfying the sharing condition information, and transmit the deactivation command for the IC chip to the first terminal device 110 in response to the toll information received from the first terminal device not satisfying the sharing condition information.

As shown in FIG. 6, the second terminal device 120 includes an input unit 121, a display unit 122, a speaker 123, a second communication unit 124, a second control unit 125, and a second storage unit 126.

The input unit 121 may receive user inputs.

User inputs may include navigation mode selection information, destination information, route selection information, and automatic toll payment service selection information.

User inputs may include user identification information.

User inputs may include login information for the first user, login information for the second user, and login information for the third user.

User inputs may include commands for interoperability with the mobile device 2.

The input unit 121 may receive user identification information and payment registration information to be registered to one of the multiple IC chips and may further receive identification information of the mobile device.

The input unit 121 may be implemented with at least one of physical buttons, keys, and switches.

It may include various hardware devices such as buttons, switches, pedals, keyboards, mice, trackballs, levers, handles, or sticks.

The input unit 121 may also include a graphical user interface (GUI), such as a touchpad, which is a software-based device. The touchpad may be implemented as a touch screen panel (TSP) and may form a layered structure with the display unit 122.

The display unit 122 may display information about the functionalities being carried out in the vehicle 1 or the second terminal device 120.

For example, the display unit 122 may display navigation information, information related to phone calls, information about content output through the mobile device 2, information related to music playback, and even external broadcast information.

The display unit 122 may display a video about subscription to the automatic toll payment service.

The display unit 122 may display a video about subscription to the remote control service.

The display unit 122 may display the identification information of a user requesting the sharing of the automatic toll payment service and approval or rejection information for the sharing request.

The display unit 122 may display the first toll information when passing through the tollgate.

The display unit 122 may display the identification information of the user in the vehicle and may also display success or failure information for user authentication.

The display unit 122 may display a video of a button for connecting with the mobile device 2 and for canceling the connection with the mobile device 2.

The display unit 122 may display the identification information of connectable mobile devices 2.

The display unit 122 may be provided as, but not limited to, a cathode ray tube (CRT), a digital light processing (DLP) panel, a plasma display panel (PDP), a liquid crystal display (LCD) panel, an electroluminescence (EL) panel, an electrophoretic display (EPD) panel, an electrochromic display (ECD) panel, a light emitting diode (LED) panel, or organic light emitting diode (OLED) panel. may be provided as a panel.

The second terminal device 120 may include only the display unit 122. In this case, the input unit may be an input device installed in the vehicle's head unit, center console, or steering wheel.

The speaker 123 may output sound corresponding to the output of the vehicle 1 or the second terminal device 120.

The speaker 123 may output navigation information as sound or voice.

The speaker 123 may output guidance information or tollgate entry and output the first toll information as sound or voice.

The speaker 123 may output sharing approval or sharing rejection information for the automatic toll payment service.

The speaker 123 may be one or more. The speaker 123 may be installed in the interior of the vehicle.

The second communication unit 124 may transmit and receive information between the components within the second terminal device 120.

The second communication unit 124 may perform communication by connecting to the vehicle network (NT).

The second communication unit 124 may send information to the first processor 150 and receive information from the first processor 150.

The second communication unit 124 may send information to the first terminal device 110 and receive information from the first terminal device 110.

The second communication unit 124 may communicate with external electronic devices (e.g., the roadside base station S2).

The second communication unit 124 may include a global positioning system (GPS) receiver to ascertain the current location information of the vehicle.

The second control unit 125 controls the execution of the navigation mode in response to the selection information of navigation mode.

Upon receiving destination information through the input unit 121, the second control unit 125 may identify the current location information of the vehicle, generate a route from the current location to the destination based on the identified current location information of the vehicle and destination information, and control the display unit 122 to display route information about the generated route.

When multiple routes are generated, the second control unit 125 may identify the route information corresponding to the route selection information received through the input unit 121, and based on the confirmed route information, map information, and current location information, generate navigation information and control the display unit 122 and speaker 123 to output the generated navigation information.

The second control unit 125 may request input of login information upon receiving an ignition on command. In this case, the second control unit 125 may control the display unit 122 to display a login input window.

The second control unit 125 may perform user identification and authentication based on the login information entered into the login input window.

Upon receiving the command to start the vehicle, the second control unit 125 may request input of the user identification information, and upon receiving the user identification information through the input unit 121, request user authentication information.

The second control unit 125 may perform user authentication based on the user identification information and user authentication information of the user received through the input unit 121. For example, the user authentication information may include a password or pattern.

Upon successfully logging in and receiving payment registration information, the second control unit 125 may transmit the received payment registration information along with the user identification information to the first server 3 and the first terminal device 110. This allows the payment registration information to be registered on one of the IC chips provided in the first terminal device.

Upon receiving subscriber ID information of the user and password through the input unit 121, the second control unit 125 may verify the stored password corresponding to the received subscriber ID, determine whether the received password matches the pre-stored password, and transmit user authentication success information to the first terminal device 110 when the received password is determined to match the pre-stored password, and user authentication failure information when the received password is determined not to match the pre-stored password.

Upon receiving subscriber ID information and pattern information through the input unit 121, the second control unit 125 may verify the stored pattern information corresponding to the received subscriber ID, determine whether the received pattern information matches the pre-stored pattern information, and transmit user authentication success information to the first terminal device 110 when the received pattern information is determined to match the pre-stored pattern information, and user authentication failure information when the received pattern information is determined not to match the pre-stored pattern information.

The second control unit 125 may control at least one of the display unit 122 and the speaker 123 to output user authentication success information or user authentication failure information.

Upon receiving the command to start the vehicle, the second control unit 125 may acquire the biometric information of the user and automatically perform user authentication based on the acquired biometric information.

The second control unit 125 may also receive user authentication success information or user authentication failure information from the authentication device 130.

The second control unit 125 may control the activation of the first terminal device 110 upon successful user authentication and the deactivation upon authentication failure.

The second control unit 125 may also transmit the identification information or location information of the tollgate to the first terminal device 110 upon entering the tollgate.

Upon receiving the second user's login information through the input unit 121, the second control unit 125 compares the received login information with the pre-stored login information for the second user, and when the received and pre-stored login information match, controls the execution of the first application. The login information may include the subscriber ID and password information. The login information may include the subscriber ID and pattern information.

When the second user is logged in and a sharing request is received through the input unit 121, the second control unit 125 may control the display unit 122 to display the identification information of users eligible for sharing, and when the identification information of the first user is selected among the eligible users, confirm the identification information of the mobile device 2 corresponding to the identification information of the first user and transmit the identification information of the second user and the sharing request information based on the confirmed identification information of the mobile device 2.

The second control unit 125 may set the IC chip corresponding to the identification information of the first user as a shareable chip.

Upon receipt of sharing approval information from the mobile device 2, the second control unit 125 may set the second user as a sharer of the first user.

The second control unit 125 may pair and store the identification information of the first user and the identification information of the second user as sharing configuration information.

Upon receiving IC chip sharing condition information through the input unit 121 after sharing approval with the second user, the second control unit 125 may transmit the received IC chip sharing condition information to at least one of the first server 3 and the mobile device 2.

Upon receiving IC chip sharing condition information from the mobile device 2 after sharing approval with the second user, the second control unit 125 may store the received IC chip sharing condition information.

Upon receiving login information of the second user through the input unit 121 after sharing approval with the second user, the second control unit 125 may transmit the activation information of the IC chip corresponding to the identification information of the first user to the first terminal device 110 and the mobile device 2.

Upon receiving the login information of the first user via the input unit 121, the second control unit 125 may transmit the activation information of the IC chip corresponding to the identification information of the first user to the first terminal device 110.

Upon receiving login information of the second user through the input unit 121, the second control unit 125 determines whether there is a sharing provider corresponding to the identification information of the second user, and when a sharing provider is identified, verifies the identification information of the sharing provider, then confirms the identification information of the mobile device corresponding to the verified user identification information (i.e., the identification information of the first user).

Upon receiving destination information through the input unit 121 after the receipt of the login information of the second user, the second control unit 125 may search for routes based on the current location information and destination information and control the display unit 122 to display the searched routes.

Upon selection of one of multiple routes through the input unit 121, the second control unit 125 acquires second toll information based on the route information for the selected route and transmits the route information and second toll information to the mobile device 2.

The second control unit 125 may acquire tollgate identification information, tollgate location information, passage prediction time information, and tollgate passage prediction fee information from the second toll information.

The second control unit 125 may transmit the identification information of the first user and the activation command for the IC chip to the first terminal device 110 upon receiving sharing approval information from the mobile device 2.

The second control unit 125 may transmit the identification information of the first user and the deactivation command for the IC chip to the first terminal device 110 upon receiving the sharing rejection information from the mobile device 2.

The second control unit 125 determines whether the passage prediction time satisfies the passage time included in the sharing conditions and whether the passage prediction fee meets the passage fee included in the sharing conditions, based on the second toll information and sharing condition information.

The second control unit 125 may transmit to the first terminal device 110 an activation command for the IC chip corresponding to the identification information of the first user when both the passage prediction time and the passage prediction fee are determined to meet the sharing conditions, and a deactivation command for the IC chip corresponding to the identification information of the first user when neither the passage prediction time nor the passage prediction fee meets the sharing conditions.

The second control unit 125 may control the display unit 122 to display the payment history information of the user who has successfully passed the user authentication.

The second control unit 125 may execute the program stored in the second storage unit 126.

The second storage unit 126 may store the program for executing the operations of the second control unit.

The second storage unit 126 may store user identification information and authentication information.

When there are multiple users of the vehicle, the second storage unit 126 may store user identification information and user authentication information for each user.

The second storage unit 126 may store the identification information of the mobile device for integrating the automatic toll payment service.

The second storage unit 126 may store user biometric information for user authentication.

User biometric information may include user facial information, voice information, fingerprint information, vein information, and iris information.

The second storage unit 126 may be implemented using at least one of non-volatile memory components such as cache, read only memory (ROM), programmable ROM (PROM), erasable programmable ROM (EPROM), electrically erasable programmable ROM (EEPROM), and flash memory, or volatile memory components such as random access memory (RAM), or storage media like hard disk drives (HDD), or compact disc-ROM (CD-ROM), without being limited to these.

The authentication device 130 may include an input device (not shown) for receiving user identification information. Here, the user identification information may include at least one of the user's name, user ID, or user's phone number.

The authentication device 130 may include a sensor (not shown) for detecting biometric authentication information.

The sensor may include an image sensor for capturing images such as the user's face or gestures.

The sensor may include charge-coupled device (CCD) or complementary metal-oxide semiconductor (CMOS) image sensor, as well as a 3-dimensional (3D) spatial recognition sensor such as KINECT (RGB-D sensor), TOF (time of flight) camera, and stereo camera.

The image sensor may include a camera to detect object information around the vehicle and convert the object information into electrical video signals.

The sensor may detect the user's biometric information.

The user's biometric information may include fingerprint information. In this case, the sensor may be a fingerprint sensor. Here, the fingerprint sensor may be a CCD camera or a CCD scanner. The fingerprint sensor may include one of a capacitive sensor, a thermal sensor, and an ultrasonic imaging sensor.

The user's biometric information may also include voice information, iris information, or vein information.

When the biometric information is voice information, the sensor may include a microphone.

When the biometric information is iris information, the sensor may include a camera or an infrared camera.

When the biometric information is vein information, the sensor may include a vein scanner or a CCD camera.

The authentication device 130 acquires the user's biometric information for user authentication and obtains biometric recognition information capable of recognizing the user from the acquired biometric information.

The authentication device 130 may register and store the acquired biometric recognition information along with the user's identification information as information for vehicle user authentication.

The authentication device 130 may perform user authentication not only through facial recognition but also through at least one of fingerprint recognition information, voice recognition information, vein recognition information, and iris recognition information.

The authentication device 130 may also control at least one of the display unit 122 and the speaker 123 of the second terminal device 120 to output guidance information suggesting updates of pre-stored user biometric recognition information based on the similarity between the received user biometric recognition information and the pre-registered user's biometric recognition information.

Upon successful user authentication, the authentication device 130 may transmit the user authentication success information and the user identification information to the first terminal device 110 and the first processor 150.

When the user authentication fails, the authentication device 130 may transmit the user authentication failure information to the first terminal device 110 and the first processor 150.

In some embodiments, the authentication device 130 may be provided in the vehicle's head unit.

The authentication device 130 may also be provided in the second terminal device 120.

The first communication device 140 communicates with the mobile device 2, the first server 3, the second server 4, and the roadside base station S2.

The first communication device 140 may transmit information received from at least one of the mobile device 2, the first server 3, the second server 4, and the roadside base station S2 to the first processor 150, and based on control commands from the first processor 150, transmit various information to at least one of the mobile device 2, the first server 3, the second server 4, and the roadside base station S2.

The first communication device 140 may include one or more components enabling communication with the internal components of the vehicle 1 and various external devices, for example, a short-range communication module, a wired communication module, and a wireless communication module.

The short-range communication module may include various types of short-range communication modules such as Bluetooth, infrared communication, radio frequency identification (RFID), wireless local access network (WLAN), near field communication (NFC), Zigbee, which utilize wireless networks for signal transmission and reception in close proximity.

The wired communication modules may include various cable communication modules such as a universal serial bus (USB) module, a high definition multimedia interface (HDMI) module, a digital visual interface (DVI) module, a recommended standard 232 (RS-232) communication module, a power line communication module, or a plain old telephone service (POTS) module, as well as various wired communication modules such as a controller area network (CAN) module, a local area network (LAN) module, a wide area network (WAN) module, or a value-added network (VAN) module.

The wired communication module may further include a Local Interconnect Network (LIN).

The wireless communication module may include radio communication modules supporting various radio communication systems such as global system for mobile communication (GSM), code division multiple access (CDMA), wide-band code division multiple access (WCDMA), universal mobile telecommunications system (UMTS), time division multiple access (TDMA), and long-term evolution (LTE).

The first processor 150 may exchange information with the first and second terminal devices 110 and 120 and the authentication device 130.

The first processor 150 may also control the automatic payment service for toll fees using the digital key registered on the mobile device 2.

When connected to the mobile device 2 via communication through the first communication device 140, the first processor 150 may interact with the first application on the mobile device 2 to control the automatic payment service for toll fees.

When connected to the mobile device 2 via communication, the first processor 150 may control the second terminal device 120 to display payment transaction information for the automatic toll payment service.

The first processor 150 may receive a request for card issuance or card deletion from the first server 3 and may transmit s card issuance or card deletion command received from the first server 3 to the first terminal device 110.

The first processor 150 may relay user authentication success or failure information received from the authentication device 130 or the second terminal device 120 to the first terminal device 110.

The first processor 150 may control the activation and standby states of the first terminal device 110 to facilitate payment for fees for services received by the user or for items purchased by the user.

For example, when the vehicle approaches a tollgate, the first processor 150 determines based on the navigation information from the second terminal device whether the vehicle is approaching the tollgate, and when it is determined that the vehicle is approaching the tollgate, the first processor 150 automatically activates the first application installed on the second terminal device and controls the first terminal device 110 to enter payment standby mode, and upon the vehicle passing through the tollgate, the first terminal device 110 automatically proceeds to pay the toll fee through the first terminal device 110.

The first processor 150 may determine that the vehicle is approaching the tollgate when the distance between the current location and the tollgate, which is based on the current location information and the tollgate location information, meets a predetermined distance.

Upon receiving the user identification information and the deactivation command for the IC chip from the mobile device 2 or the first server 3, the first processor 150 may transmit the received user identification information and the deactivation command for the IC chip to the first terminal device 110.

Upon receiving the user identification information and the activation command for the IC chip from the mobile device 2 or the first server 3, the first processor 150 may transmit the received user identification information and the activation command for the IC chip to the first terminal device 110.

Upon receiving the identification information of the second user and sharing request information via the second terminal device 120, the first processor 150 may identify the first identification information of the first user as the sharing requestee based on the sharing request information, identify the identification information of the mobile device corresponding to the identification information of the first user, and transmit the sharing request information and the identification information of the second user based on the identified identification information of the mobile device.

Upon receiving sharing approval information or sharing rejection information from the mobile device 2, the first processor 150 may transmit the received sharing approval information or sharing rejection information to the second terminal device 120 and the first server 3.

Upon successful login by the second user via the second terminal device 120, the first processor 150 may determine whether there is a sharing provider based on the identification information of the second user, and when it is determined that there is a sharing provider, identify the identification information of the mobile device corresponding to the identification information of the sharing provider and transmit route information to mobile device 2 based on the identification information of the identified mobile device.

Upon receiving the sharing condition information and the identification information of the second user from the mobile device 2 or the second terminal device 120, the first processor 150 may store the received sharing condition information and the identification information of the second user. The sharing condition information and the identification information of the second user may constitute sharing configuration information.

Upon receiving sharing approval information from mobile device 2, the first processor 150 may transmit an activation command for the IC chip corresponding to the identification information of the first user to the first terminal device 110.

Upon receiving sharing rejection information from mobile device 2, the first processor 150 may transmit a deactivation command for the IC chip corresponding to the identification information of the first user to the first terminal device 110.

The first processor 150 may transmit an activation command for the IC chip to the first terminal device when the second passage information meets the sharing condition, and may transmit a deactivation command for the IC chip to the first terminal device when the second passage information does not meet the sharing condition.

Upon receiving the user identification information and the deletion request information for the IC chip from the first server 3, the first processor 150 may transmit the user identification information and the deletion request information for the IC chip to the first terminal device. The deletion request information for the IC chip may be a request to delete payment registration information stored in the IC chip.

The first processor 150 controls the overall operation of the vehicle.

The first processor 150 may be implemented with a memory (not shown) that stores data for algorithms or programs reproducing algorithms for controlling the operations of vehicle components, and a processor (not shown) that performs the operations using the data stored in the memory.

The first memory 151 may store the vehicle's identification information and the user's identification information.

The first memory 151 may store the identification information of users sharing the IC chip.

The first memory 151 may store the identification information of the mobile device performing the digital key service, the authentication information of the mobile device, and the digital key.

The first memory 151 may store the identification information of the mobile device 2 for performing the automatic toll payment service, payment registration information, and user authentication information (e.g., password).

When there are multiple users, the first memory 151 may store identification information of each user, identification information of each user's mobile device, payment registration information for each user, and authentication information for each user.

When there are multiple users, the first memory 151 may additionally store biometric recognition information of each user.

The user's identification information may include the user's account information.

The user's account information may include the phone number, username, email address, and photo provided by the user when contracting the vehicle.

The user's account information may be identical to the login information registered through the application installed on the mobile device 2.

The biometric recognition information may include at least one of facial recognition information, fingerprint recognition information, iris recognition information, vein recognition information, and voice recognition information.

The first memory 151 may delete user identification information and biometric recognition information in response to control commands from the first processor 150.

The first memory 151 may be implemented using at least one of non-volatile memory components such as cache, read only memory (ROM), programmable ROM (PROM), erasable programmable ROM (EPROM), electrically erasable programmable ROM (EEPROM), and flash memory, or volatile memory components such as random access memory (RAM), or storage media like hard disk drives (HDD), or compact disc-ROM (CD-ROM), without being limited to these.

The first memory 151 may be implemented as memory separate from the processor described in relation to the first processor 150 or as a single chip with the first processor 150.

Depending on the performance of the components of the vehicle of FIG. 3, the first terminal device of FIG. 4, and the second terminal device of FIG. 6, at least one component may be added or removed. In addition, it will be easily understood by those skilled in the art that the mutual positions of the components may vary according to the performance or structure of the system.

Meanwhile, each component shown in FIGS. 3, 4, and 6 refers to a software and/or hardware component like a field programmable gate array (FPGA) and application specific integrated circuit (ASIC).

Figure 7:
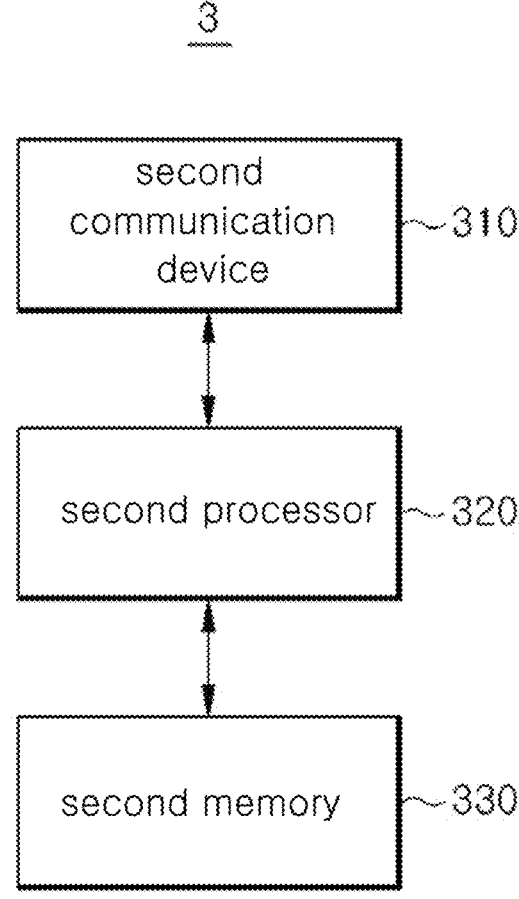
FIG. 7 is a control block diagram of a first server according to an embodiment.

FIG. 7 is a control block diagram of a first server according to an embodiment.

The first server 3 may be a server owned by the vehicle manufacturer or a server located at a service center managing the vehicle 1 or a manufacturer's facility. The first server 3 may also be an application (app) server, a telematics server, or a platform server configured to provide services related to the vehicle 1. The first server 3 may also be a server used during the vehicle development phage.

The first server 3 may be one of a card company's server, a server providing a convenient payment service (e.g., smart pay service), a vehicle manufacturer's server, a server providing a digital key service, or a vehicle management server.

As shown in FIG. 7, the first server 3 may include a second communication device 310, a second processor 320, and a second memory 330.

The second communication device 310 may communicate with the vehicle 1, the mobile device 2, and the second server 4.

The second communication device 310 may include one or more components enabling communication with internal components of the first server 3 and various external devices, for example, at least one of a short-range communication module, a wired communication module, and a wireless communication module.

Specific examples of short-range communication modules, wired communication modules, and wireless communication modules are omitted here because they are the same as those described for the first communication device.

The second processor 320 may transmit a card issuance command for the IC chip to the first terminal device 110 of the vehicle when receiving payment registration information and user identification information from the mobile device 2 or the second terminal device 120 of the vehicle 1.

The second processor 320 may transmit the identification information of the IC chip and the card deletion command for the IC chip to the first terminal device 110 of the vehicle when receiving deletion request information for payment registration information from the mobile device 2 or the second terminal device 120 of the vehicle 1.

The second processor 320 may facilitate payment for toll fees through the automatic toll payment service based on the login information received from the mobile device 2 or the vehicle 1.

The second processor 320 may transmit the first toll information to the mobile device 2 or the vehicle 1.

The second processor 320, upon receiving the vehicle's identification information and the IC chip's identification information from the vehicle, may make a comparison among the received vehicle's identification information, the received IC chip's identification information, and the pre-stored IC chip's identification information matched to the vehicle's identification information, and when there is a mismatch, transmit a deactivation command for the IC chip.

The second processor 320, upon receiving the user's identification information and payment registration information from the vehicle 1, verifies the received user's identification information and payment registration information, and then transmits an activation command for the IC chip corresponding to the user's identification information to the vehicle 1.

The second processor 320, upon receiving the second user's identification information matching the first user's identification information from the vehicle 1, stores the identification information of both users as users sharing the IC chip.

The second processor 320, upon receiving sharing condition information from the mobile device 2, stores the identification information of the first user and the sharing condition information.

As shown in FIG. 8, the sharing condition information may include the identification information of the requester (i.e., the identification information of the second user), the identification information of the provider (i.e., the identification information of the first user), the payment availability time information for paying with the IC chip, payment limit information, vehicle identification information, and IC chip identification information (application identifier (AID)).

The sharing condition information may further include route information, identification information of tollgates, and location information of tollgates.

The second processor 320, upon receiving login information from the vehicle 1, may identify the user's identification information based on the received login information, confirm the identification information of the IC chip corresponding to the identified user's identification information, and transmit an activation command for the IC to the vehicle 1 based on the confirmed IC chip's identification information.

The second processor 320, upon receiving login information from the vehicle 1, may identify the user's identification information based on the received login information, determine whether there is identification information of an IC chip sharing provider corresponding to the identified user's identification information, and when it is determined that identification information of an IC sharing provider exists, confirm the identification information of the IC chip corresponding to the identification information of the IC chip sharing provider, and transmit an activation command for the IC to the vehicle 1 based on the confirmed IC chip's identification information.

The second processor 320 may receive the identification information of the IC chip and the activation information of the IC chip from the vehicle 1.

The second processor 320 may be composed of one or more processors.

The second processor 320 may be implemented a memory (not shown) that stores data for algorithms or programs reproducing algorithms for controlling the operations of the components constituting the first server 3, and a processor (not shown) that performs the operations using the data stored in the memory. Here, the memory and processor may be implemented as separate chips. The memory and processor may also be implemented as a single chip.

The second memory 330 may store the identification information of the user utilizing the vehicle 1, the identification information of the vehicle, and the identification information of the mobile device.

The user's identification information stored in the first server 3, the identification information of at least one mobile device 2, and the identification information of the vehicle may be registered information accessed through the application (app) installed on the second terminal device 120 of the vehicle or on the mobile device 2.

The second memory 330 may store payment registration information matched to the identification information of the vehicle and the user.

The second memory 330 may store vehicle usage pattern information corresponding to the identification information of the user. The vehicle usage pattern information may be the same as the usage pattern information of the first terminal device.

The vehicle usage pattern information may refer to the usage pattern information of the vehicle or the first terminal device over a predetermined period.

The second memory 330 may be implemented using at least one of non-volatile memory components such as cache, read only memory (ROM), programmable ROM (PROM), erasable programmable ROM (EPROM), electrically erasable programmable ROM (EEPROM), and flash memory, or volatile memory components such as random access memory (RAM), or storage media like hard disk drives (HDD), or compact disc-ROM (CD-ROM), without being limited to these.

Meanwhile, each component shown in FIG. 7 means software and/or hardware components such as a Field Programmable Gate Array (FPGA) and an Application Specific Integrated Circuit (ASIC).

Depending on the performance of the components of the first server 3 shown in FIG. 3, at least one component may be added or removed. In addition, it will be easily understood by those skilled in the art that the mutual positions of the components may vary according to the performance or structure of the system.

Figure 9:
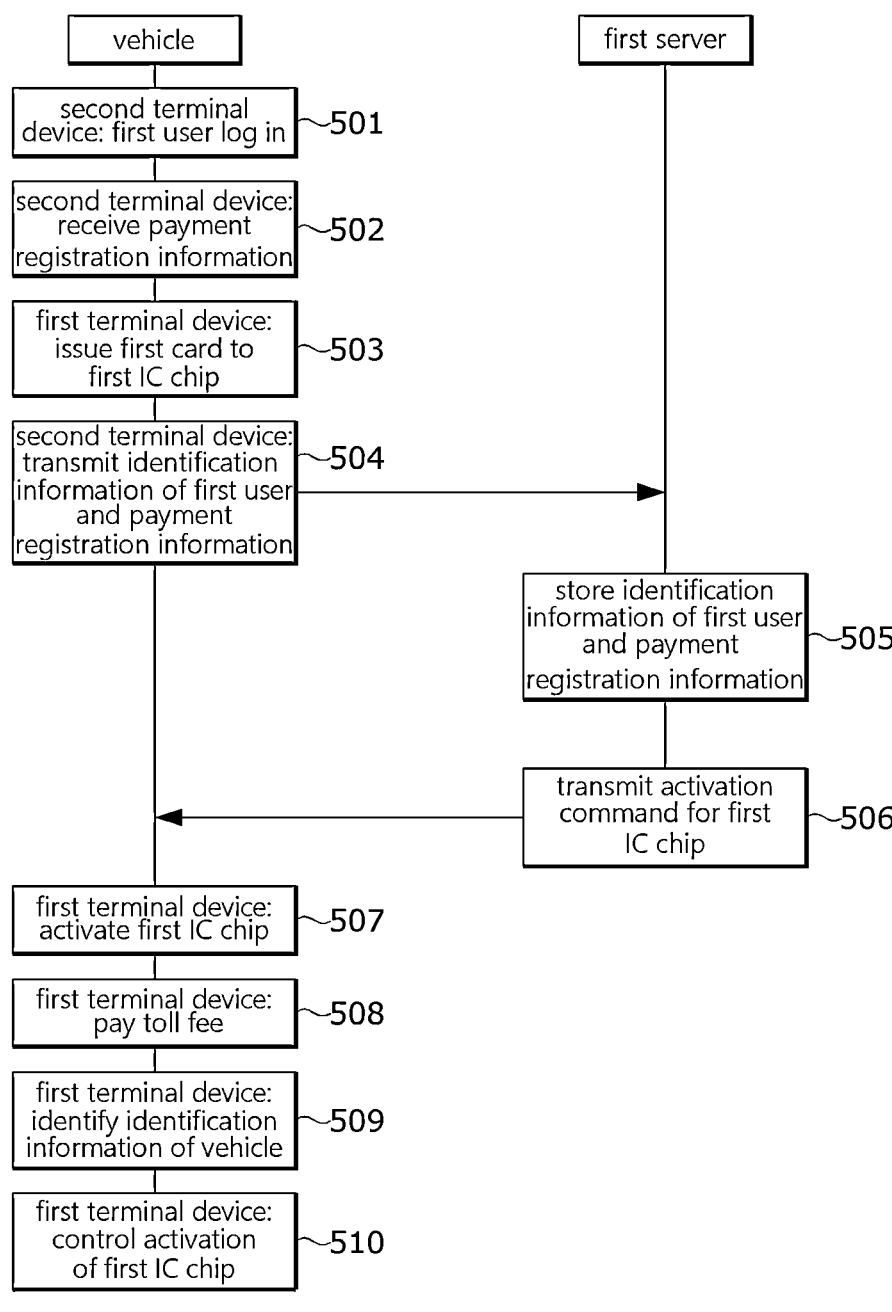
FIG. 9 is a flowchart illustrating a sequence for issuing a card for an IC chip installed in a vehicle according to an embodiment.

FIG. 9 is a flowchart illustrating a sequence for issuing a card for an IC chip installed in a vehicle according to an embodiment.

After the completion of subscription to the connected car service, when the login information of the first user is received through the second terminal device 120 of the vehicle, the vehicle may determine the success or failure of the login based on the received login information of the first user and the pre-stored login information of the first user.

When the received login information of the first user is determined to be identical to the pre-stored login information of the first user, the vehicle determines at step 501 that the first user has successfully logged in to the application for the connected car service.

The vehicle verifies the first user's identification information based on the first user's login information, and when a card issuance command and payment registration information are received through the second terminal device 120 at step 502, matches and stores the verified first user's identification information with the received payment registration information, and issues at step 503 the first card for toll fee payment with the first IC chip of the first terminal device based on the verified first user's identification information and the received payment registration information.

The first server 3 may also transmit the received identification information and payment registration information of the first user to the vehicle 1 when the registration information is received from the mobile device 2 after the first user has logged in through the mobile device 2. In this case, the vehicle 1 may also issue, upon receiving the identification information and payment registration information of the first user from the first server 3, the first card for toll fee payment with the first IC chip of the first terminal device based on the received identification information and payment registration information of the first user.

After the issuance of the first card to the first IC chip is completed, the vehicle may transmit the identification information and payment registration information of the first user to the first server 3 at step 504.

Upon receiving the identification information and payment registration information of the first user from the vehicle, the first server 3 determines whether the user who issued the first card based on the identification information and card information stored in the first server 3 is a registered user in the first server 3.

The identification information of the first user stored in the first server 3 may include the identification information of the user registered in the first server of the card company when issuing the card through the card company.

Upon determining that the first user is a registered user in the first server, the first server 3 may store the identification information and payment registration information of the first user at step 505 and transmit user verification information and an activation command for the first IC chip to the vehicle 1 at step 506.

Upon receiving user verification information and an activation command for the first IC chip from the first server 3, the vehicle activates the first IC chip of the first terminal device 110 at step 507.

The vehicle may use the activated first IC chip to pay the toll fee at step 508 when passing through the tollgate.

When the vehicle transitioning from off state to on state, the first terminal device 110 of the vehicle verifies, at step 509, the vehicle's identification information received from the second terminal device 120.

The first terminal device 110 of the vehicle compares the verified vehicle's identification information with the pre-stored vehicle's identification information to determine whether the verified vehicle's identification information matches the pre-stored vehicle's identification information.

Here, determining whether the verified vehicle's identification information matches the pre-stored vehicle's identification information may include determining whether the received vehicle identification number (VIN) information matches the pre-stored VIN information.

The first terminal device 110 of the vehicle may control the activation of the first IC chip at step 510 based on whether the verified vehicle's identification information matches the pre-stored vehicle's identification information.

That is, the first terminal device 110 of the vehicle may control the activation of the IC chip in response to the verified vehicle's identification information matching the pre-stored vehicle's identification information, control the deactivation of the IC chip in response to the verified vehicle's identification information mismatching the pre-stored vehicle's identification information.

When there are multiple IC chips embedded in the first terminal device 110, the first terminal device 110 may control the activation of multiple IC chips based on whether the verified vehicle's identification information matches the pre-stored vehicle's identification information.

The first terminal device 110 may transmit the payment registration information of the IC chips to the second terminal device 120 when controlling the activation of the IC chips. The payment registration information of each IC chips may include the application identifier (AID).

The first terminal device 110 may transmit the payment registration information stored in the activated IC chips to the second terminal device.

The second terminal device identifies the user based on the login information.

When the identified user is determined to be the first user, the second terminal device may transmit the identified first user's identification information and the payment registration information stored in the activated IC chips to the first server 3.

The first server 3 verifies the identification information of the IC chip corresponding to the first user's identification information, and then transmits the verified IC chip's identification information and the first user's identification information to the second terminal device. The first server 3 may transmit an activation command for the IC chip along with the IC chip's identification information and the first user's identification information.

Upon receiving the IC chip's identification information, the first user's identification information, and the activation command for the IC chip, the second terminal device may transmit the IC chip's identification information and the activation command for the IC chip to the first terminal device.

The first terminal device may activate the IC chip based on the IC chip's identification information and the activation command for the IC chip. In this case, the first terminal device may deactivate the remaining IC chips. The remaining IC chips may be those registered by users other than the first user.

Figure 10A:
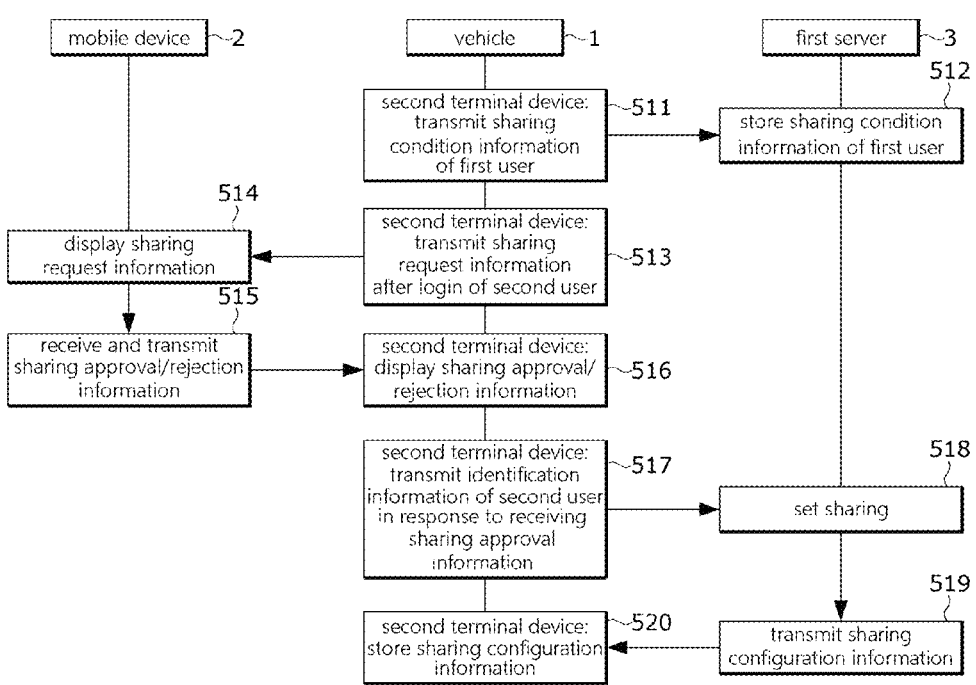
FIG. 10A is a flowchart illustrating a control sequence for sharing an IC chip installed in a vehicle according to an embodiment.
Figure 10B:
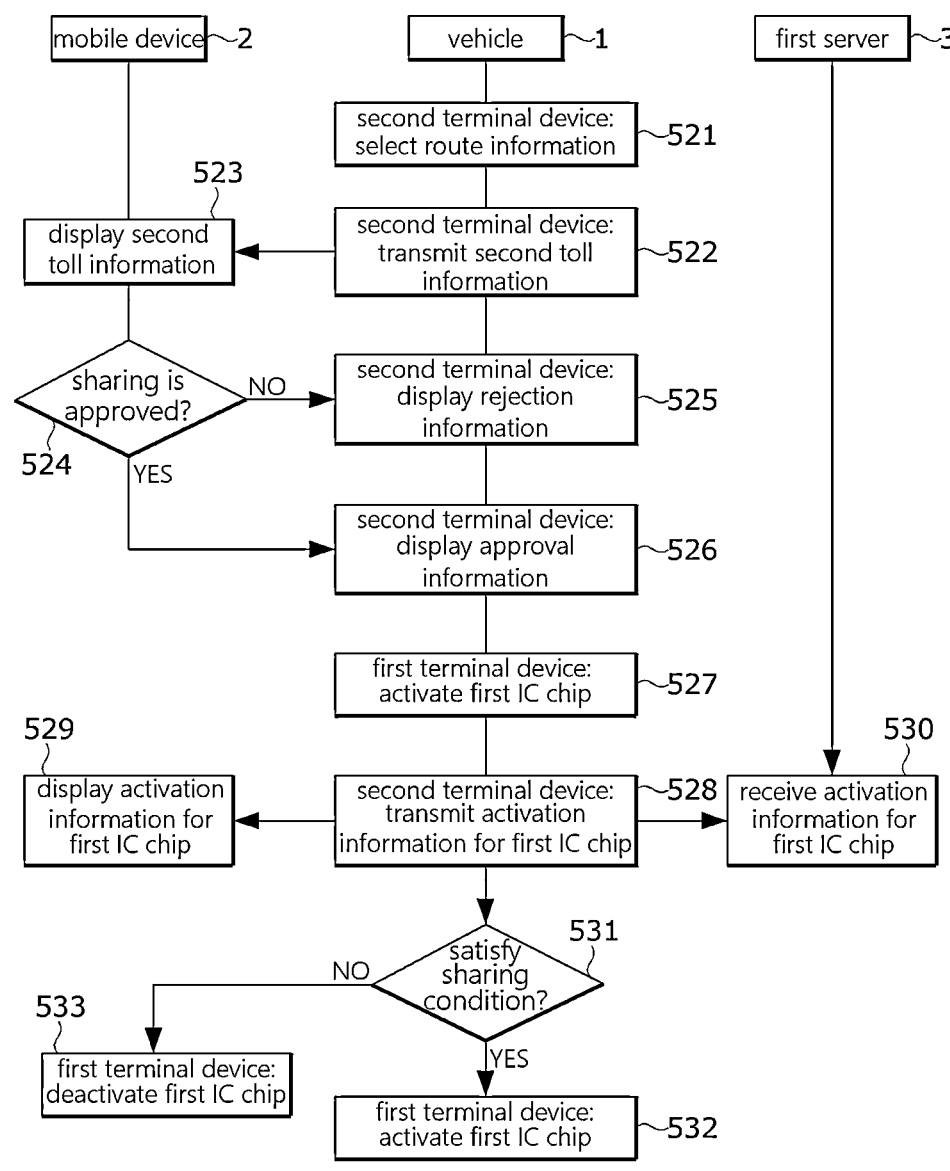
FIG. 10B is a flowchart illustrating a control sequence for sharing an IC chip installed in a vehicle according to an embodiment.

FIGS. 10A and 10B are a flowchart illustrating a control sequence for sharing an IC chip installed in a vehicle according to an embodiment.

Upon receiving shared condition information in the logged-in state of the first user, the second terminal device of the vehicle may transmit the received shared condition information to the first server 3 at 511.

At step 512, the first server 3 may store the sharing condition information received from the vehicle 1 by matching it with the identification information of the first user.

Upon receiving a sharing request message requesting the sharing of the IC chip with the first user while the second user is logged in, the second terminal device of the vehicle may identify the identification information of the mobile device corresponding to the identification information of the first user and transmit the sharing request information of the second user to the mobile device 2 based on the identified identification information of the mobile device at step 513.

At step 514, the mobile device 2 may display the sharing request information of the second user that received from the vehicle. At step 515, the mobile device 2 may transmit to the vehicle the sharing rejection information upon receiving the sharing rejection information input by the first user and the sharing approval information upon receiving the sharing approval information input by the first user.

At step 516, the second terminal device of the vehicle may display the sharing rejection information upon receiving the sharing rejection information from the mobile device 2 and display the sharing approval information upon receiving the sharing approval information from the mobile device 2.

At step 517, the second terminal device of the vehicle may, upon receiving the sharing approval information, transmit the identification information of the second user to the first server 3 along with the identification information of the first IC chip and the payment registration information of the first IC chip.

At step 518, the first server 3 may set the second user as the sharing requester to share the first user's first IC chip upon receiving the sharing approval information, the identification information of the second user, the identification information of the first IC chip, and the payment registration information of the first IC chip.

The first server may verify the sharing condition information corresponding to the first user's identification information, generate sharing configuration information for the second user based on the verified first user's sharing condition information, the first user's identification information, the second user's identification information, the first IC chip's identification information, and the first IC chip's payment registration information, store the generated second user's sharing configuration information, and transmit the second user's sharing configuration information to vehicle 1 at step 519.

Upon receiving the second user's sharing configuration information from the first server, the second terminal device of the vehicle may store the received second user's sharing configuration information at step 520.

When the navigation mode is selected and destination information is received while the second user is logged in, the second terminal device 120 of the vehicle may search for routes from the vehicle's current location to the destination based on the vehicle's current location information and destination information, and display route information for the searched routes.

When one of the routes is selected by the second user at step 521, the second terminal device 120 may obtain second toll information based on the route information of the selected route and transmit the obtained second toll information and the route information to the mobile device 2 at step 522.

Here, the second toll information refers to the information obtained based on the route information and may include the identification information of the tollgate predicted to be passed by the vehicle, the location information of the tollgate, toll fee information, and passage time information.

Upon receiving the second toll information and route information, the mobile device 2 may display the received second toll information and route information at step 523.

The mobile device 2 determines at step 524 whether to approve sharing based on the second toll information.

At step 524, the mobile device 2 may transmit to the second terminal device of the vehicle the sharing rejection information upon receiving the sharing rejection information input by the first user and the vehicle sharing approval information upon receiving the sharing approval information input by the first user.

The vehicle may display the sharing rejection information at step 525 upon receiving the sharing rejection information from the mobile device and display the sharing approval information at step 526 upon receiving the sharing approval information from the mobile device.

In response to receiving the sharing approval information, the second terminal device of the vehicle may verify the identification information of the first IC chip corresponding to the identification information of the first user and transmit the identification information of the first IC chip and an activation command for the first IC chip to the first terminal device.

Upon receiving the identification information of the first IC chip and the activation command for the first IC chip, the first terminal device of the vehicle may activate the first IC chip at step 527 and send status information corresponding to the activation status of the first IC chip to the second terminal device.

The second terminal device of the vehicle may transmit the status information corresponding to the activation status of the first IC chip from the first terminal device to the mobile device 2 and the first server 3.

That is, when the first IC chip is activated, the second terminal device of the vehicle may transmit the activation information of the first IC chip to the mobile device and the first server at step 528.

At step 529, the mobile device 2 may display the activation information of the first IC chip upon receiving the status information corresponding to the activation status of the first IC chip from the second terminal device of the vehicle.

The first server may receive the activation information of the first IC chip from the second terminal device of the vehicle at step 530 and store the received activation information of the first IC chip.

The mobile device may display the deactivation information of the first IC chip upon receiving the status information corresponding to the deactivation status of the first IC chip from the second terminal device 120.

The second terminal device of the vehicle may determine at step 531 whether the first toll information satisfies the sharing condition information while the second user is sharing the first IC chip.

The second terminal device 120 of the vehicle may send the first terminal device the activation command for the first IC chip when the first toll information satisfies the sharing condition information, and the deactivation command for the first IC chip when the first toll information does not satisfy the sharing condition information.

The first terminal device of the vehicle may activate the first IC chip at step 532 upon receiving the activation command for the IC chip and deactivate the first IC chip at step 533 upon receiving the deactivation command for the IC chip.

Meanwhile, the disclosed embodiments may be implemented in the form of a recording medium storing instructions executable by a computer. The instruction may be stored in the form of a program code, and when executed by a processor, a program module may be generated to perform operations of the disclosed embodiments. The recording medium may be implemented as a computer-readable recording medium.

The computer-readable recording medium includes any type of recording medium in which instructions readable by the computer are stored. For example, there may be a read only memory (ROM), a random access memory (RAM), a magnetic tape, a magnetic disk, a flash memory, an optical data storage device, and the like.

The disclosed embodiments have been described as above with reference to the accompanying drawings. Those skilled in the art will understand that the disclosure may be implemented in a form different from the disclosed embodiments without changing the technical spirit or essential features of the disclosure. The disclosed embodiments are illustrative and should not be construed as limiting.

The disclosure is advantageous in terms of improving the convenience of automatic toll payment by interconnecting the IC chip in the first terminal device of the vehicle with the second terminal device.

The disclosure is also advantageous in terms of facilitating the easy setup of a second user to share the IC chip of the first terminal device (HI-PASS terminal device) by establishing a setting for the second user to share the IC chip embedded in the first terminal device of the vehicle using the mobile device of the first user. The disclosure is also advantageous in terms of preventing unauthorized users, who are not designated as sharers, from using the IC chip of the first terminal device to pay toll fees.

The disclosure is also advantageous in terms of allowing the automatic toll payment to be carried out with the IC chip only for the second user when the second toll information meets the sharing conditions established by the first user for the IC chip.

The disclosure is also advantageous in terms of allowing the first user to easily and quickly confirm payment transactions made by the second user by displaying payment history paid for the second user through the mobile device of the first user or the second terminal device of the vehicle (AVN terminal device).

The disclosure is also advantageous in terms of preventing misuse and abuse of the first terminal device of the vehicle. That is, the disclosure can prevent unauthorized use and misuse of the payment-enable IC chip embedded in the first terminal device.

The disclosure is advantageous in terms of eliminating the inconvenience of physically inserting a credit card and the risk of losing a credit card when required to be inserted into the first terminal device by allowing automatic toll payment using the IC chip embedded in the first terminal device.

The disclosure is also advantageous in terms of contributing to environmental sustainability by reducing the plastic used in manufacturing credit cards.

The disclosure is also advantageous in terms of being implemented through software modification without change in hardware, thereby preventing a certain cost from being incurred by adding and manufacturing hardware.

The disclosure is also advantageous in terms of enhancing the marketability of vehicles and the first terminal device, leading to increased user satisfaction, improved user trust, and ultimately, a more competitive product.

What is claimed is:

1. A vehicle comprising:

a first terminal device comprising an integrated circuit (IC) chip configured to perform payment;

an input unit configured to receive user input;

a second terminal device configured to provide a user interface;

a memory configured to store first login information of a first user and second login information of a second user; and a communication device configured to communicate with a mobile device of the first user and a server, wherein the second terminal device is configured to, in response to receiving route information from the second user via the input unit after the second user is logged in:

acquire predicted toll information, the predicted toll information including a predicted toll fee and a predicted passage time for a tollgate expected to be passed, based on the received route information;

transmit the received route information and the acquired predicted toll information to the mobile device of the first user to request an approval for a specific trip corresponding to the route information;

transmit an activation command to the first terminal device to activate the IC chip, only after receiving the approval for the specific trip from the mobile device of the first user; and transmit status information indicating that the IC chip is activated to the mobile device of the first user and the server, after the first terminal device activates the IC chip.

2. The vehicle of claim 1, wherein the memory is further configured to store sharing condition information associated with the IC chip, and the sharing condition information comprises at least one of payment limit information and payment availability time information for the IC chip of the first terminal device.

3. The vehicle of claim 2, wherein the second terminal device controls login of the second user based on the second login information of the second user and transmits, upon receiving route information via the input unit while the second user is logged in, the received route information to the mobile device.

4. The vehicle of claim 3, wherein the second terminal device acquires identification information of a tollgate expected to be passed by the vehicle based on the received route information, acquires predicted toll fee information and predicted passage time information based on the acquired identification information of the tollgate, and determines whether to activate the IC chip of the first terminal device based on the acquired predicted toll fee information, the predicted passage time information, and the sharing condition information when receiving the approval for the specific trip from the mobile device of the first user.

5. The vehicle of claim 4, wherein the second terminal device transmits a deactivation command for the IC chip to the first terminal device when at least one of the acquired predicted toll fee information and predicted passage time information does not satisfy the sharing condition information, and transmits an activation command for the IC chip to the first terminal device when both the acquired predicted toll fee information and predicted passage time information satisfy the sharing condition information when receiving the approval for the specific trip from the mobile device of the first user.

6. The vehicle of claim 2, wherein the sharing condition information further comprises identification information of the IC chip of the first terminal device, the first login information of the first user, the second login information of the second user, and identification information of the vehicle, and the second terminal device transmits the sharing condition information to the server.

7. The vehicle of claim 2, wherein the second terminal device transmits the second login information of the second user to the server, receives sharing configuration information of the second user from the server, and determines whether to activate the IC chip of the first terminal device based on the received sharing configuration information of the second user, wherein the sharing configuration information of the second user comprises identification information of the first user sharing the IC chip with the second user and the sharing condition information.

8. The vehicle of claim 1, wherein the second terminal device transmits activation information or deactivation information of the IC chip of the first terminal device to the mobile device and the server.

9. The vehicle of claim 1, wherein the second terminal device transmits, upon receiving the first login information of the first user and payment registration information of the IC chip from the mobile device, the received first login information of the first user and payment registration information of the IC chip to the first terminal device, and wherein the first terminal device determines whether to issue a card through the IC chip based on the received first login information of the first user and the payment registration information of the IC chip.

10. The vehicle of claim 1, wherein the second terminal device transmits, upon receiving the first login information of the first user and payment registration information of the IC chip from the input unit, the received first login information of the first user and the payment registration information of the IC chip to the first terminal device.

11. The vehicle of claim 10, wherein the second terminal device transmits, upon completion of card issuance through the IC chip, the first login information of the first user received through the input unit and the payment registration information to the server and transmits an activation command for the IC chip to the first terminal device based on the first login information of the first user received through the input unit and the payment registration information of the IC chip.

12. The vehicle of claim 1, wherein the first terminal device compares, upon receiving identification information of the vehicle from the second terminal device, first identification information of the vehicle and pre-stored second identification information of the vehicle and determines to deactivate the IC chip based on the first identification information of the vehicle and the pre-stored second identification information of the vehicle being different.

13. The vehicle of claim 1, wherein the second terminal device transmits, upon receiving the first login information of the first user from the mobile device, an activation command for the IC chip to the first terminal device, and wherein the first terminal device pays, when passing through a tollgate, toll fee using the IC chip.

14. An electronic toll collection system comprising:

a mobile device of a first user;

a vehicle comprising a memory configured to store first login information of the first user and second login information of a second user, and a first terminal device comprising an integrated circuit (IC) chip configured to perform payment, and a second terminal device configured to provide a user interface;

a server configured to communicate with the mobile device and the vehicle, wherein the second terminal device of the vehicle is configured to perform aper-trip authorization process by:

in response to receiving route information from the second user via an input unit after the second user is logged in:

acquiring predicted toll information, the predicted toll information including at least a predicted toll fee and a predicted passage time for a tollgate expected to be passed, based on the received route information;

transmitting the received route information and the acquired predicted toll information to the mobile device of the first user to request an approval for a specific trip corresponding to the route information;

transmitting an activation command to the first terminal device to activate the IC chip, only after receiving the approval for the specific trip from the mobile device of the first user; and transmitting status information indicating that the IC chip is activated to the mobile device of the first user and the server, after the first terminal device activates the IC chip.

15. The electronic toll collection system of claim 14, wherein the memory is further configured to store sharing condition information associated with the IC chip, and the sharing condition information comprises payment limit information and payment availability time information of the IC chip of the vehicle, identification information of the IC chip, the first login information of the first user, the second login information of the second user, and identification information of the vehicle.

16. The electronic toll collection system of claim 15, wherein the server, when receiving the login information of the second user and sharing request information from the vehicle and sharing approval information and sharing condition information from the mobile device, generates sharing configuration information for the IC chip based on the sharing condition information, and transmits the sharing configuration information generated for the IC chip to the vehicle.

17. The electronic toll collection system of claim 14, wherein the server stores, upon receiving status information of the IC chip from the vehicle, the received status information of the IC chip.

18. The electronic toll collection system of claim 14, wherein the server transmits the activation command of the IC chip after identifying the first user based on the first login information of the first user and payment registration information of the IC chip received from the vehicle or the mobile device.

19. The electronic toll collection system of claim 14, wherein the server stores payment transaction information for payments made through the IC chip by each user based on the login information received from the vehicle.

20. The electronic toll collection system of claim 14, wherein the server compares, upon receiving identification information of the vehicle and identification information of the IC chip from the vehicle, the received identification information of the vehicle, the received identification information of the IC chip, and the identification information of the IC chip matched with pre-stored identification of the vehicle and controls a transmission of a deactivation command for the IC chip.

\* \* \* \* \*